(12) United States Patent
Kendall (10) Patent No.: US 7,100,489 B1
(45) Date of Patent: Sep. 5, 2006

(54) SYSTEM AND METHOD FOR HITCH WITH BACKUP ANTI-JACK KNIFE AND ANTI-DIVE

(75) Inventor: Donald H. Kendall, Chassell, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/178,065

(22) Filed: Jul. 11, 2005

(51) Int. Cl.
   *B64D 1/22* (2006.01)
(52) U.S. Cl. .................. 89/1.13; 172/450; 172/445.1; 56/15.9
(58) Field of Classification Search ............... 89/1.13; 56/14.7, 14.9, 15.8, 15.9; 172/439, 450, 172/449, 445.1
   See application file for complete search history.

(56) References Cited

U.S. PATENT DOCUMENTS

| | | | |
|---|---|---|---|
| 1,559,526 A | 10/1925 | Osborn | |
| 2,455,636 A | 12/1948 | Woolson | |
| 2,489,349 A * | 11/1949 | White ..................... | 89/1.13 |
| 2,500,970 A | 3/1950 | Walker | |
| 3,271,050 A | 9/1966 | Saunders | |
| 3,294,421 A * | 12/1966 | Mathisen ................. | 280/455.1 |
| 3,542,394 A | 11/1970 | Palage | |
| 3,771,413 A | 11/1973 | Sieg et al. | |
| 3,857,586 A * | 12/1974 | Mascuch .................. | 280/432 |
| 4,134,602 A | 1/1979 | Boger | |
| 4,491,053 A * | 1/1985 | Bar-Nefy et al. ......... | 89/1.13 |
| 4,679,959 A | 7/1987 | Cavallaro | |
| 4,693,164 A | 9/1987 | Grinwald | |
| 4,723,473 A | 2/1988 | Grinwald | |
| 4,909,128 A | 3/1990 | Grinwald | |
| 5,016,899 A * | 5/1991 | Euteneier ................. | 280/446.1 |
| 5,280,940 A | 1/1994 | Kendall | |
| 5,348,331 A * | 9/1994 | Hawkins ................. | 280/476.1 |
| 5,364,117 A * | 11/1994 | Keith ..................... | 280/459 |
| 5,711,542 A | 1/1998 | Kendall | |
| 5,786,542 A | 7/1998 | Petrovich et al. | |
| 5,806,870 A | 9/1998 | Hull et al. | |
| 6,042,137 A | 3/2000 | McIntosh | |
| 6,073,953 A | 6/2000 | Kendall | |
| 6,443,345 B1 | 9/2002 | Bloemer et al. | |
| 6,604,353 B1 | 8/2003 | Johnson | |
| 6,698,527 B1 * | 3/2004 | White et al. ............. | 172/450 |
| 6,746,035 B1 | 6/2004 | Williams et al. | |
| 6,915,728 B1 * | 7/2005 | Renwick et al. .......... | 89/1.13 |

* cited by examiner

*Primary Examiner*—Michelle Clement
*Assistant Examiner*—Stewart Knox
(74) *Attorney, Agent, or Firm*—David L. Kuhn; Thomas W. Saur; Luis Miguel Acosta (57) ABSTRACT

For use in landmine clearing, a hitch system providing backup with anti-jack knife and anti-dive, the system includes a hitch assembly and a roller assembly. The hitch assembly has a hinge axis housing containing a hinge shaft and a connector shaft housing containing a stop block having a first side that engages a flat region on the hinge shaft and a second side that engages a biasing spring that is held in the connector shaft housing using an end cap. The roller assembly includes a roller frame that is rigidly mechanically coupled to the hinge shaft. The biasing spring is selected to provide a compressive bias to the stop block such that the roller assembly selective rotates about the hinge axis housing when the roller assembly is subjected to a landmine detonation, and such that rotation of the hinge shaft is prevented during normal forward, reverse, and turning maneuvers.

18 Claims, 5 Drawing Sheets

SYSTEM AND METHOD FOR HITCH WITH BACKUP ANTI-JACK KNIFE AND ANTI-DIVE

GOVERNMENT INTEREST

The invention described here may be made, used and licensed by and for the U.S. Government for governmental purposes without paying royalty to me.

BACKGROUND OF THE INVENTION

1. Field of the Invention

The present invention generally relates to a hitch system and method for backup with anti-jack knife and anti-dive.

2. Background Art

Figure 1:
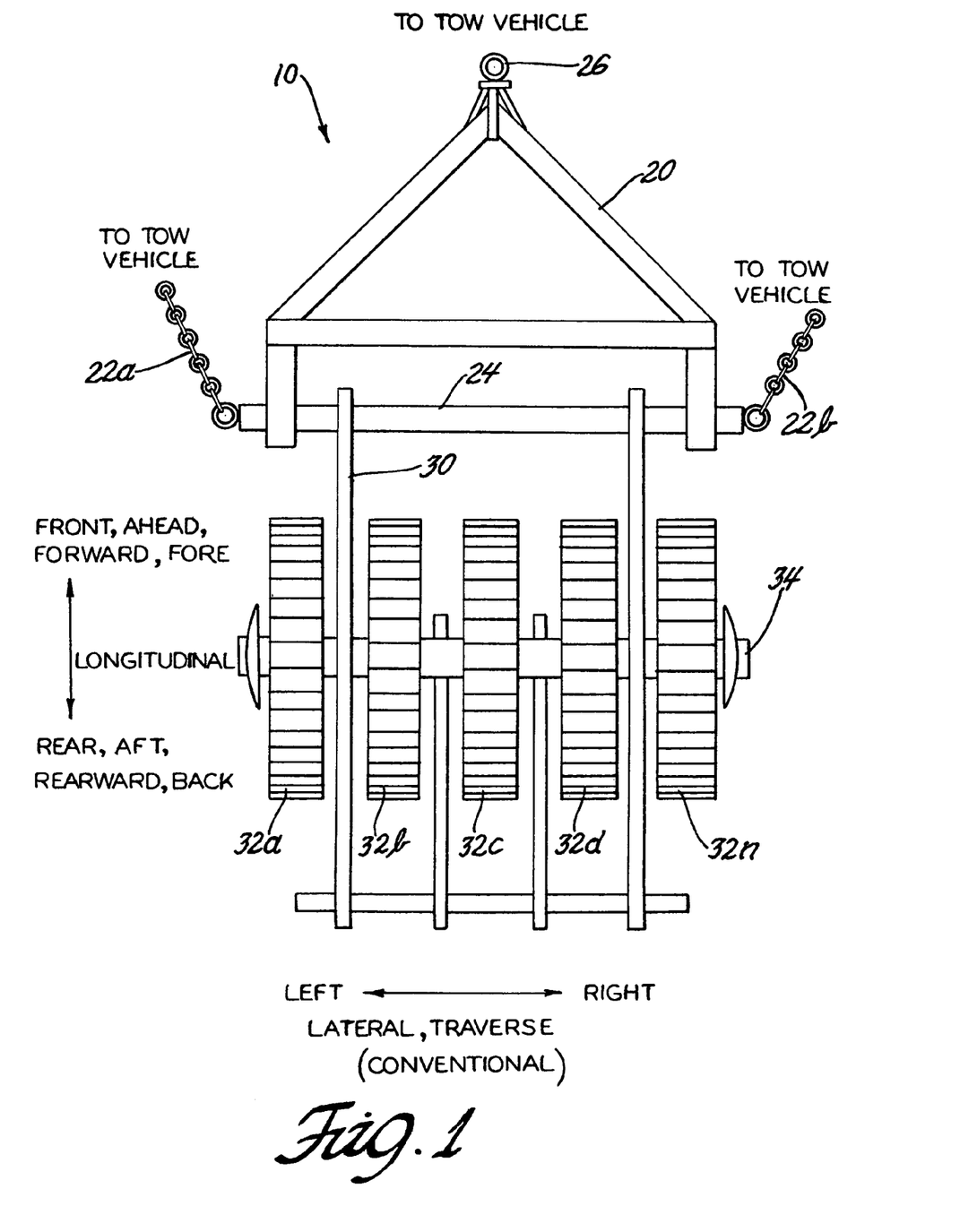
FIG. 1 is a diagram of a top view of a conventional aft end landmine clearing apparatus.

Military vehicles that are used for clearing landmines are typically equipped with landmine clearing apparatuses (e.g., massive cog-wheel rollers that explode buried landmines) on the fore and aft ends of the vehicle. Referring to FIG. 1, a diagram illustrating a top view of a conventional aft end landmine clearing apparatus 10 is shown. The apparatus 10 can be towed behind a vehicle (not shown) to clear (i.e., detonate) landmines that are buried in terrain.

The apparatus 10 typically includes a drawbar assembly 20 having chains 22a and 22b with first ends connected at left and right ends, respectively, of a shaft 24, and a tow eyelet 26. The second ends of the chains 22 and the eyelet 26 are generally mechanically coupled to the tow vehicle. The chains 22 generally permit the apparatus 10 to swivel during forward motion turns while providing support for the rear of the assembly 20 such that the assembly 20 is elevated above the terrain.

A roller frame 30 is typically mechanically coupled to the shaft 24 such that the frame 30 rotates about the shaft 24 particularly during a landmine explosion event. The frame 30 generally includes a roller sub-assembly having massive cog-wheel rollers 32 (e.g., rollers 32a–32n) that rotate on a roller shaft 34 and explode landmines to clear an area.

The apparatus 10 is typically towed behind the military vehicle during normal operation. However, upon some occasions an operator of the vehicle may wish to reverse directions of (i.e., back up) the vehicle. Under many operating terrain conditions, the apparatus 10 will jack knife or dive (i.e., the frame 30 will dig into the terrain) during back up operations. Thus, the apparatus 10 will impede or prevent the desired rearward vehicle motion. Such impeded or prevented vehicle operation can inconvenience or endanger the vehicle operators and occupants, and can damage the apparatus 10.

Another situation that can cause damage to the apparatus 10 is when the vehicle is moving forward or backing up and a landmine is exploded causing the rollers 32 to first become elevated (and rotate about the shaft 24) and then drop. When the rollers 32 drop, the drawbar 20 and the frame 30 can be jammed into the terrain and damaged.

Thus, there exists a need and an opportunity for an improved a hitch system and method for backup with anti-jack knife and anti-dive. Such an improved system and method may overcome one or more of the deficiencies of the conventional approaches.

SUMMARY OF THE INVENTION

Accordingly, the present invention may provide an improved hitch system and method for backup with anti-jack knife and anti-dive reduction or prevention. Such a system and apparatus may overcome one or more of the deficiencies of conventional approaches.

According to the present invention, for use in landmine clearing, a hitch system providing backup with anti-jack knife and anti-dive is provided. The system comprises a hitch assembly and a roller assembly. The hitch assembly has a hinge axis housing containing a hinge shaft and a connector shaft housing containing a stop block having a first side that engages a flat region on the hinge shaft and a second side that engages a biasing spring that is held in the connector shaft housing using an end cap. The roller assembly comprises a roller frame that is rigidly mechanically coupled to the hinge shaft. The biasing spring is selected to provide a compressive bias to the stop block such that the roller assembly selective rotates about the hinge axis housing when the roller assembly is subjected to a landmine detonation, and such that rotation of the hinge shaft is prevented during normal forward, reverse, and turning maneuvers.

Also according to the present invention, a method of providing tow vehicle backup with anti-jack knife and anti-dive for clearing landmines is provided. The method comprises rigidly mechanically coupling a hinge axis housing containing a hinge shaft and a connector shaft housing containing a stop block having a first side that engages a flat region on the hinge shaft and a second side that engages a biasing spring that is held in the connector shaft housing using an end cap to form a hitch assembly, and rigidly mechanically coupling a roller assembly that comprises a roller frame to the hinge shaft. The biasing spring is selected to provide a compressive bias to the stop block such that the roller assembly selective rotates about the hinge axis housing when the roller assembly is subjected to a landmine detonation, and such that rotation of the hinge shaft is prevented during normal forward, reverse, and turning maneuvers.

Further, according to the present invention, a drawbar hitch system providing backup with anti-jack knife and anti-dive is provided. The system comprises a hinge axis housing containing a hinge shaft and a connector shaft housing containing a stop block having a first side that engages a flat region on the hinge shaft and a second side that engages a biasing spring that is held in the connector shaft housing using an end cap, and a connector shaft that is slidable inside of the connector shaft housing, the connector shaft housing further houses a transverse portion of the hinge shaft at the intersection of the connector shaft housing with the hinge axis housing, and the connector shaft has a first end that includes a tang that is configured to engage at least one matching slot in the hinge shaft and thereby prevent rotation of the hinge shaft during normal reverse maneuvers and when the roller assembly is subjected to a landmine detonation.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an improved hitch system and method for backup with anti-jack knife and anti-dive. Such a system and method may be advantageously implemented in connection with a mine clearing apparatus. However, the improved hitch system and method of the present invention may be implemented in connection with any appropriate towing system to meet the design criteria of a particular application.

Figure 2:
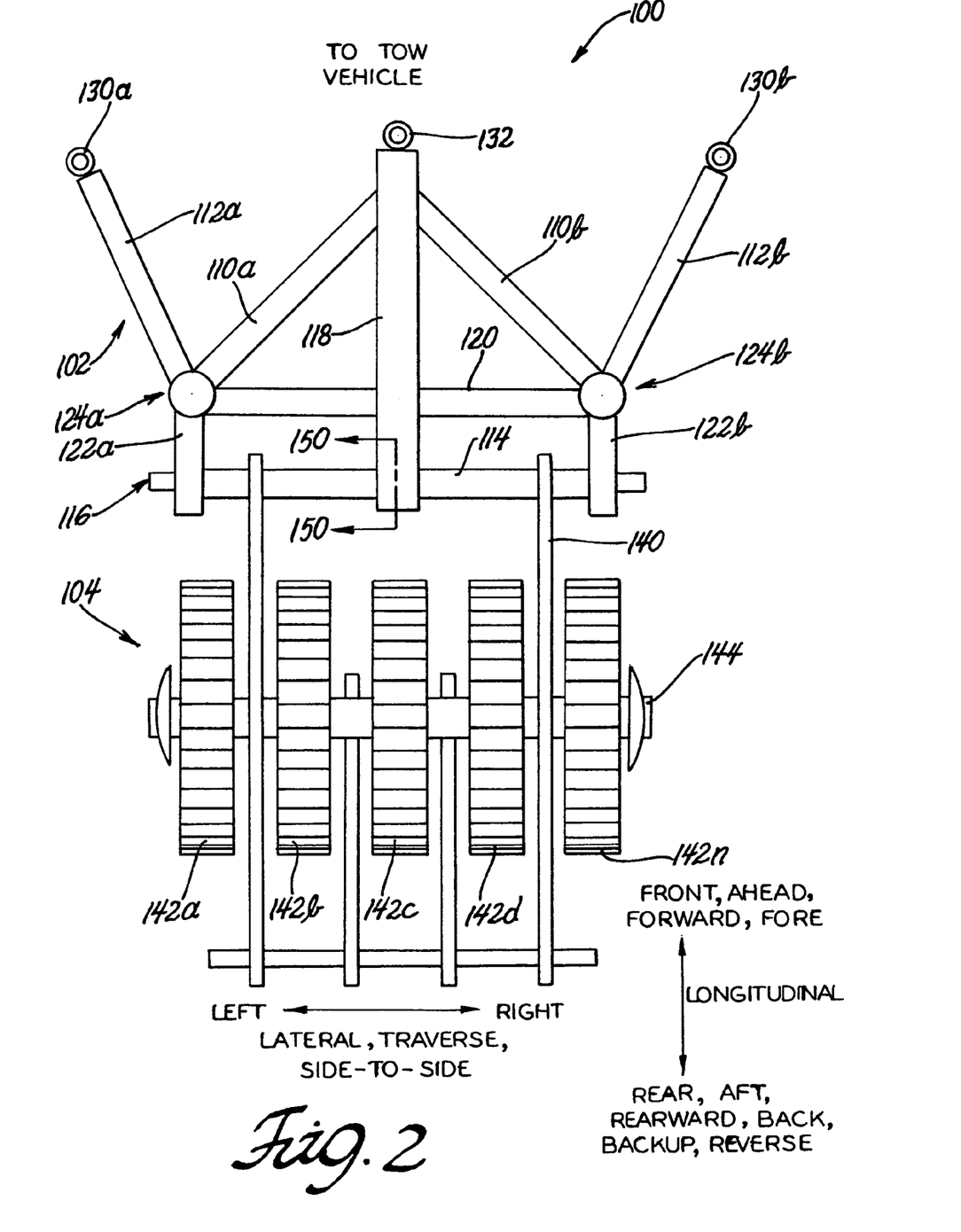
FIG. 2 is a diagram of a top view of aft end landmine clearing apparatus (or system) of the present invention.

Referring to FIG. 2, a diagram illustrating a simplified top view of an aft end landmine clearing apparatus (e.g., system, assembly, arrangement, etc.) 100 implementation of the present invention is shown. Various aspects of the system 100 are simplified for clarity of explanation in FIG. 2 and are described in more detail in connection with FIGS. 3–12. The apparatus 100 is typically towed (i.e., pulled, drawn, dragged, etc.) behind a military vehicle (not shown) to detonate landmines that are buried in terrain (ground) on which the vehicle and the system 100 operate during a normal landmine clearing operation. However, upon some occasions an operator of the vehicle may wish to reverse directions of (i.e., back up) the vehicle. The present invention generally provides a reduction or prevention of jack knife and dive by the aft end landmine clearing apparatus 100 during backing up operations.

Longitudinal and lateral directions relative to the system 100 are generally as illustrated. As such, vertical (i.e., up/down, upward/downward, etc.) directions (see, for example, FIG. 3) are generally perpendicular to the longitudinal/lateral plane.

The system 100 generally comprises a hitch (e.g., drawbar, tow bar, connector, coupler, etc.) assembly (e.g., subsystem, apparatus, unit, etc.) 102 and a roller assembly 104. The assembly 102 may include left and right connector assembly arms 110a and 110b, respectively, left and right turning control arms 112a and 112b, respectively, a hinge axis housing 114 containing a hinge shaft 116, a connector housing 118, a cross brace/latch housing 120, left and right lateral beams 122a and 122b, respectively, left and right pivot assemblies 124a and 124b, respectively, left and right control eyelets 130a and 130b, respectively, and a tow connector eyelet 132.

The connector assembly arms 110, the hinge axis housing 114, the connector housing 118, the cross brace/latch housing 120, the lateral beams 122, and the pivot assemblies 124 are generally combined (e.g., mechanically coupled by welding, bolting, etc.) to form a substantially rigid framework.

The eyelets 130 and the eyelet 132 are generally mechanically coupled (i.e., connected, hooked, fastened, latched, etc.) to the tow vehicle such that the system 100 may towed behind the tow vehicle when the tow vehicle moves in a forward direction.

The roller assembly 104 generally comprises a roller frame 140 that may be mechanically coupled (e.g., welded, bolted, etc.) to the shaft 116 such that the sub-system 104 rotates about the shaft housing 114 and the shaft 116 selectively rotates within the shaft housing 114 when the system 100 is subjected to an explosive event (e.g., when the roller assembly 104 detonates a landmine). However, as discussed in more detail below, the assemblies 102 and 104 generally latch at an operating position during normal forward, reverse, and turning modes of operation of the apparatus 100.

The frame 140 generally includes a roller sub-assembly having a plurality of massive cog-wheel rollers 142 (e.g., rollers 142a–142n) that rotate on a roller shaft 144 and explode (e.g., trigger the detonation of) landmines to clear an area when drawn by the vehicle. The sub-system 104 is generally implemented having sufficient weight (mass) to detonate landmines that are encountered in the environment (e.g., buried underground) where the present invention is implemented.

The turning control arms 112 are generally slidable (e.g., in-out slide) and pivotable (e.g., side-to-side swing) in the respective pivot housings 124 during forward motion of the system 100. However, the turning control arms 112 generally latch at an operating position during reverse and lateral motion of the apparatus 100. The eyelet 132 is generally mechanically coupled to a first end of a tow connector (e.g., shaft) 160 (shown, for example, in FIGS. 3–5). The tow connector shaft 160 is generally slidable (in-out slide), to a limited extent, in the connector housing 118. As such, the sub-assembly 104 may rotate (e.g., flex, bend, articulate, twist, etc.) relative to the tow vehicle to accommodate changes in terrain beyond the amount (i.e., level, degree, etc.) of movement provided by a conventional apparatus such as the mine detonation device 10.

Figure 3:
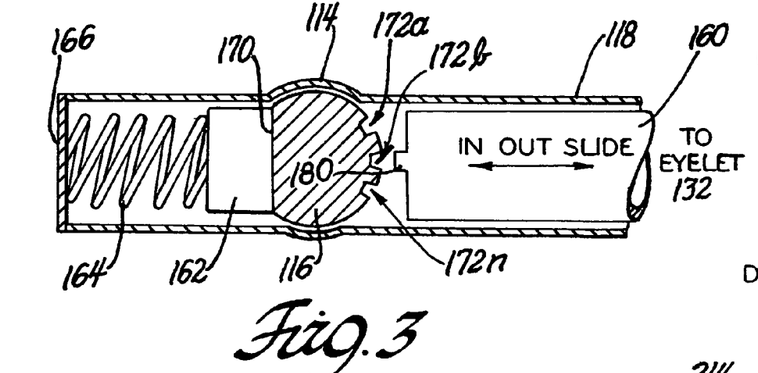
FIG. 3 is a sectional diagram of a tow connector coupling of a tow bar assembly of the system of FIG. 2.

Referring to FIG. 3, a diagram illustrating a sectional view taken at lines 150—150 of FIG. 2 is shown. As illustrated in FIG. 3, the apparatus 100 is generally operating in a forward towed mode on substantially level terrain. FIG. 3 generally illustrates an example of an apparatus for latching the sub-system 102 to the sub-system 104 to selectively limit rotation at the hinge axis formed by the shaft 116.

The housing 118 generally houses (i.e., holds, contains, etc.) the shaft 160, a transverse portion of the shaft 116 at the intersection (i.e., the inverted "T") with the hinge housing 114, a stop block 162, and a spring 164. An end cap 166 may be attached (e.g., threadably fastened, and the like) at the end of the housing 118 that is opposite the end of the housing 118 where the eyelet 132 is implemented.

The shaft 116 generally includes a flat region 170 that normally engages a face of the stop block 162. The flat 170 may be sized to receive the respective face of the stop block 162. The spring 164 is generally disposed (i.e., placed, positioned, installed, etc.) between the stop block 162 and the end cap 166. The spring 164 is generally selected to provide a compressive bias to the stop block 162 (i.e., the spring 164 urges the stop block 162 against the flat region 170) such that rotation of the shaft 116 is prevented during normal forward, reverse, and turning maneuvers of the hitch system 100.

On the side of the shaft 116 that is opposite the flat 170, the shaft 116 generally includes a plurality of recesses (e.g., grooves, slots, holes, etc.) 172 (e.g., slots 172a–172n). At the end opposite the eyelet 132, the connector shaft 160 generally includes at least one tang (i.e., pawl, lug, protrusion, etc.) 180. The tang 180 is generally sized to engage (e.g., mate into) respective ones of the slots 172. The tang 180 will generally engage or not engage respective ones of the slots 172 depending on the mode of operation of the apparatus 100 (as discussed in more detail below) to further restrict rotation of the shaft 116 and lateral motion of the hinge shaft 116 and thus the sub-assembly 104 including the rollers 142. As illustrated in FIG. 3, during a normal forward motion of the tow vehicle, the pawl 180 is generally not engaged in any of the slots 172.

Figure 4:
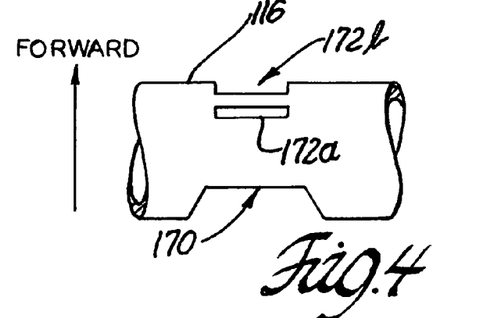
FIG. 4 is a side view of a portion of a hinge axis shaft of the system of FIG. 2.

Referring to FIG. 4, a diagram illustrating a top view of the center portion (e.g., the portion that resides at the intersection of the housings 114 and 118) of the shaft 116 is shown. As illustrated in FIG. 4, the shaft 116 is rotated such that the slots 172 are more clearly illustrated. However, the hinge shaft 116 is generally oriented substantially as shown in FIG. 3 (i.e., the flat 170 is generally abutted by the respective face surface of the stop block 162 and the lug 180 is disengaged from all of the recesses 172) during a forward towed mode of operation on substantially level terrain.

Figure 5:
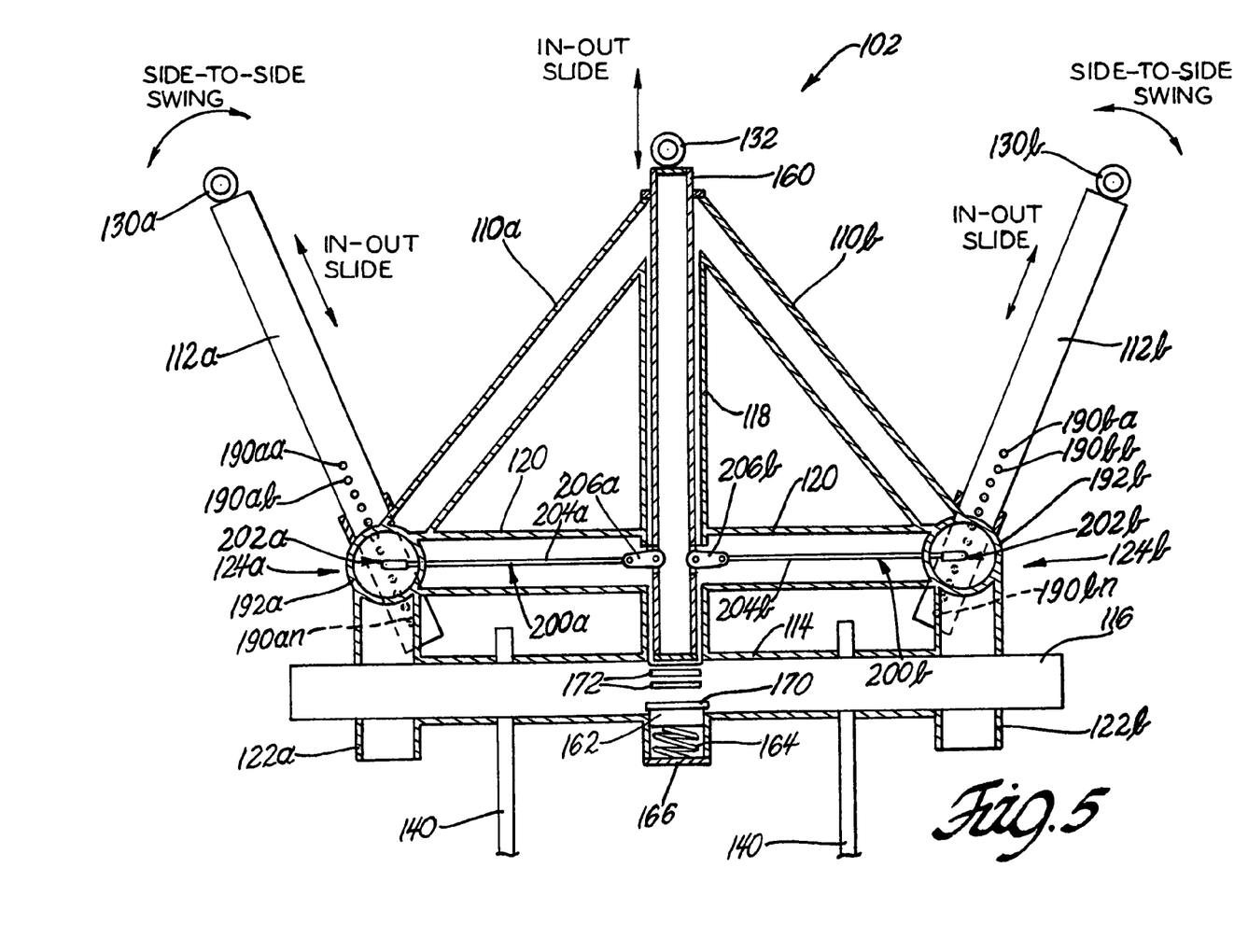
FIG. 5 is a sectional diagram of a top view illustrating some details of the tow bar assembly of the system of FIG. 2.

Referring to FIG. 5, a section top view illustrating additional details of the apparatus 102 is shown. The control arms 112 each generally further comprise respective latch holes 190 (e.g., latch holes 190aa, 190ab . . . 190an in the control arm 112a, and latch holes 190ba, 190bb . . . 190bn in the control arm 112b) at the end that engages respective pivot assemblies 124. Internal to the latch housing 120, the system 100 generally comprises respective left and right latch apparatuses (e.g., mechanisms, devices, sub-systems, etc.) 200 (e.g., left latch apparatus 200a and right latch apparatus 200b). The respective left and right intersections of the connector assembly arms 110, the latch housing 120, and the lateral beams 122 generally comprise substantially vertical, substantially cylindrical turning arm pivot housings 192 (e.g., a left turning arm pivot housing 192a and a right turning arm pivot housing 192b).

The latch apparatus 200 generally comprises a locking device 202 (e.g., left and right locking devices 202a and 202b, respectively), an interconnect cable 204 (e.g., left and right interconnect cables 204a and 204b, respectively), and a pull link 206 (e.g., left and right pull links 206a and 206b, respectively). The cable 204 generally flexibly and rotatably mechanically couples the respective locking device 202 and the pull link 206 at opposing ends. As described in more detail below in connection with FIGS. 10–12, the locking device 202 generally engages a hole 190 to lock (i.e., stop, prevent, etc.) in-out sliding of the respective control arm 112, particularly during a backing up operation.

The pull link 206 generally has a first end that is rotatably coupled to the cable 204 and a second end that is rotatably coupled to the connector shaft 160. As illustrated in FIG. 5, in one example, the second end of the link 206 may be coupled (e.g., using a bolt, rivet, pin, and the like) to an outer edge of the connector shaft 160. The latch apparatuses 200 are shown in a locked mode in FIG. 5, as may occur during a backing up operation.

The side-to-side swing (i.e., pivot) of the control arms 112 is described in more detail below in connection with FIGS. 6–9. The latch apparatuses 200 are described in more detail below in connection with FIGS. 10–12.

Figure 6:
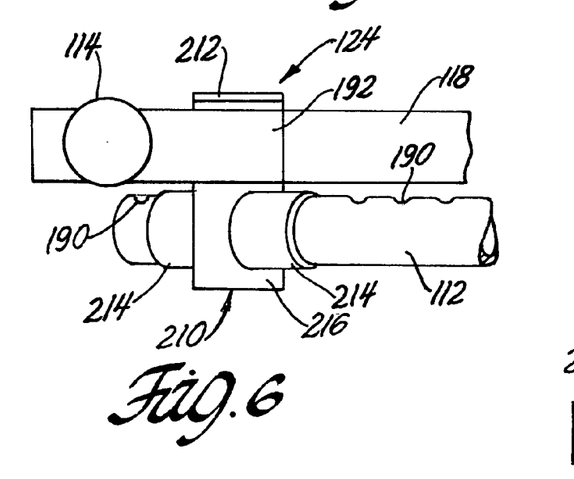
FIG. 6 is a diagram illustrating a side view of a pivot assembly of the system of FIG. 2.
Figure 7:
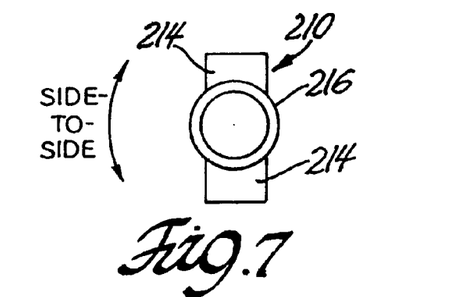
FIG. 7 is a diagram illustrating a top view of a pivot of the system of FIG. 2.
Figure 8:
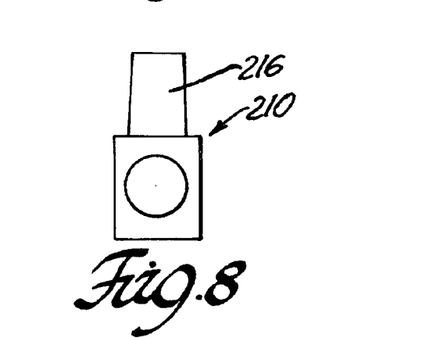
FIG. 8 is a diagram illustrating an end view of a pivot of the system of FIG. 2.
Figure 9:
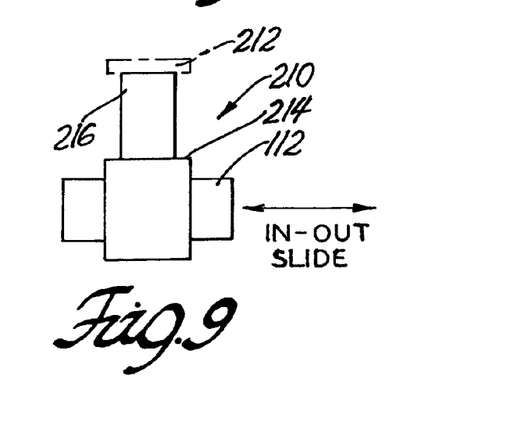
FIG. 9 is a diagram illustrating a side view of a pivot of the system of FIG. 2.

Referring to FIG. 6, a diagram illustrating a side view of a section of the apparatus 100 including the pivot apparatus 124. The pivot apparatus 124 generally comprises the turning arm pivot housing 192 and a pivot 210. That is, respective pivots 210 that are pivotably (e.g., rotatably) mounted in the turning arm pivot housings 192. Referring to FIGS. 7–9, diagrams illustrating respective top, end and side views of the pivot 210 are shown.

The pivot 210 generally comprises an end cap 212 that generally holds the pivot 210 in the turning arm pivot housing 192, a control arm housing 214 that is shaped to slidably receive the respective control arm 112 (i.e., the in-out sliding of the control arm 112 occurs within the control arm housing 214), and a substantially cylindrical pivot stub 216. The pivot stub 216 is generally sized to receive the end cap 212 at an end that extends generally vertically through the turning arm pivot housing 192. The side-to-side pivot of the control arm 112 is generally achieved via rotation of the pivot stub section 216 of the pivot 210 in the turning arm pivot housing 192.

Figure 10:
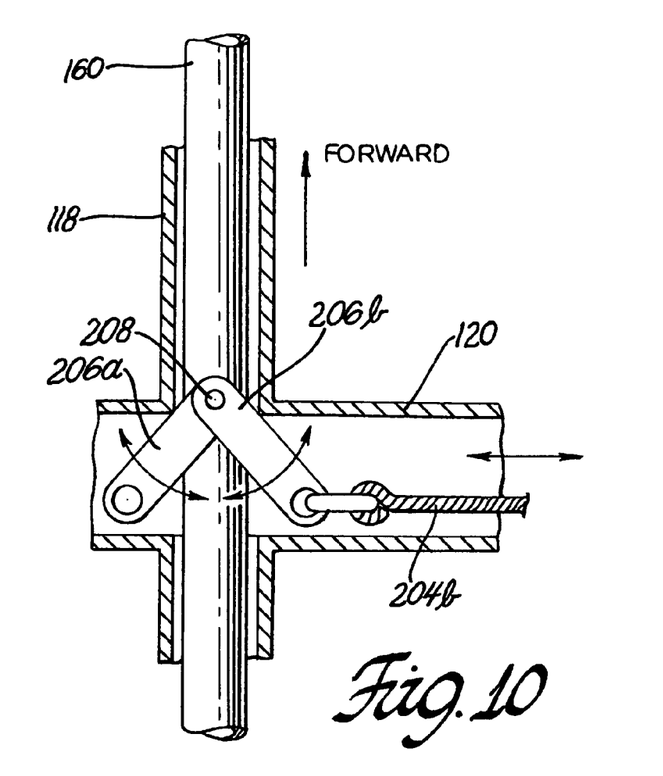
FIG. 10 is a sectional diagram of a top view illustrating some additional details of the tow bar assembly of the system of FIG. 2.

Referring to FIG. 10, in another example the links 206 may be coupled to the shaft 160 using a single pin link 208 at about the lateral center of the connector shaft 160. Referring also to FIG. 5, when the apparatus 100 is towed from a stationary position to a forward moving position, the bar 160 is generally urged slidably forward. The links 206 may encounter (e.g., interfere with) the inner surface of the intersection of the housings 118 and 120 and rotate about the link pin (or, alternatively, respective link pins) 208 such that tension is applied to the cables 204a and 204b and the sliding movement of the connector shaft 160 is limited.

Figure 11:
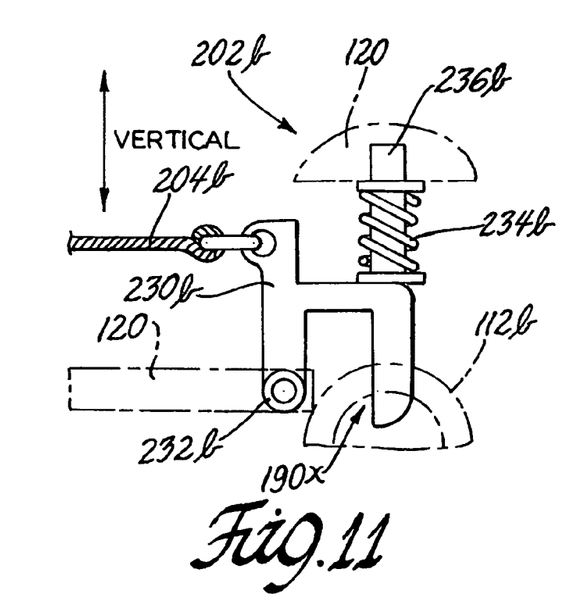
FIG. 11 is a side view of a latch apparatus of the system of FIG. 2.
Figure 12:
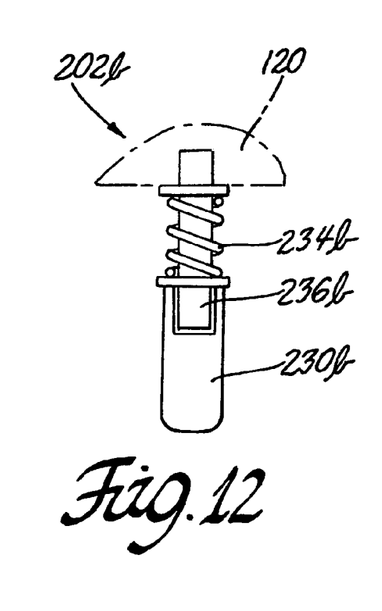
FIG. 12 is an end view of a latch apparatus of the system of FIG. 2.

Referring to FIGS. 11 and 12 (in connection with FIGS. 5 and 10), the locking device 202 (e.g., locking device 202b as illustrated in FIGS. 11 and 12) generally comprises a latch key 230 (e.g., latch key 230b), a latch rotation pin 232 (e.g., latch rotation pin 232b), a latch spring 234 (e.g., latch spring 234b), and a stabilizer pin 236 (e.g., stabilizer pin 236b). The latch spring 234 is generally implemented as a coil spring.

The latch key 230 may have a first leg that may engage a hole 190 in the control arm 112 (e.g., a hole 190x in the control arm 112b shown in phantom in FIG. 11), and a second leg that may be mechanically coupled to the cable 204b at a first end and rotatably mechanically coupled to the housing 120 (shown in phantom) via the respective latch rotation pin 232b. The latch spring 234 may be positioned under compression to provide a biasing force between an inner surface of the latch housing 120 and the first leg of the latch key 230.

The biasing force between the inner surface of the housing 120 and the first leg of the latch key 230 generally biases the latch key 230 towards engagement in a hole 190. The biasing force between the inner surface of the latch housing 120 and the first leg of the latch key 230 is generally overcome by the tension generated on the cable 204 when the system 100 is towed in a forward direction which may cause the control arms 112 to be free to move slidably in the respective pivot assemblies 124 (e.g., the latch mechanisms 202 may be unlatched).

The stabilizer pin 236 is generally disposed internal (e.g., inside the coils of the spring) to the spring 234 and is generally sized having a length such that both ends of the pin 236 extend outside of the latch spring 234. The ends of the pin 236 generally engage respective notches (recesses) in the cross brace/latch housing 120 and the latch key 230.

The present invention generally provides for the landmine clearing assembly 104 to move substantially freely during mine clearing maneuvers (i.e., operations, procedures, processes, methods, steps, etc.) including turns. However, the drawbar system 100 (i.e., the combination of the sub-system 102 and the sub-system 104) may be substantially rigid during backing up (i.e., tow vehicle reverse motions) to reduce or prevent lateral jack knife and downward diving effects that can impede or prevent the desired reverse motion and damage the apparatus 100.

During backing procedures the tow connector 160 moves generally rearward inside the connector housing 118 and mates up with (i.e., mechanically couples to) the hinge axis shaft 116 (e.g., the pawl 180 engages a slot 172) to prevent the hinge shaft 116 from overcoming the stop block 162 and the force exerted by the biasing spring 164. The biasing spring 164 is generally selected (i.e., chosen, determined, calculated, picked, etc.) such that the force exerted is generally sufficient to prevent decoupling of the pawl 180 at the shaft slots 172.

In contrast, the tow connector shaft 160 also engages and releases the locking mechanism cables 204 that are used to lock the turning control arms 112 in place. Such locking of the turning control arms 112 may reduce or prevent the system 100 from jack knifing. The cables 204 are generally slack during backing which generally provides for the springs 234 to push the pin legs of the latch keys 230 into one of several holes 190 in the turning control arms 112.

When the locking mechanism 202 is not engaged, the rollers 142 are generally free to move laterally (i.e., transversely, swing side to side, etc.) on the shaft 116 in the housing 114. The lateral movement of the rollers 142 generally provides accommodation to variations in the terrain upon which the system 100 generally is used. The turning control arms 112 slide in and out of the turning arm pivot 210 which pivots in the pivot housing 192.

The stop block 162 generally restricts movement of the hinge axis shaft 116 except during landmine blast occurrences and during backing up operations. The connector shaft spring 164 is generally selected such that a force from the connector shaft biasing spring 164 on the flat region 170 of the stop block 162 that is sufficient to maintain horizontal orientation of the drawbar assembly 102 vis a vis the roller assembly 104 off the terrain during normal operation of the apparatus 100 such that chains such as the chains 22 of the conventional apparatus 10 may be deleted in the present invention.

However, the upward force of a landmine blast may be much greater than the connecting spring 164 force. As such, the unit 100 will generally absorb energy and reduce or prevent structural damage. The stop block 162 will generally self-reset into the flat region 170 of the hinge axis shaft 116 during forward motion of the apparatus 100 in response to the force exerted by the spring 164.

As is apparent then from the above detailed description, the present invention may provide an improved hitch system and method for backup with anti-jack knife and anti-dive. The system and method of the present invention may be advantageously implemented in connection with tow vehicles such as military vehicles used for clearing landmines.

Various alterations and modifications will become apparent to those skilled in the art without departing from the scope and spirit of this invention and it is understood this invention is limited only by the following claims.

What is claimed is:

1. For use in landmine clearing, a hitch system providing backup with anti-jack knife and anti-dive, the system comprising:
   a hitch assembly having a hinge axis housing containing a hinge shaft and a connector shaft housing containing a stop block having a first side that engages a flat region on the hinge shaft and a second side that engages a biasing spring that is held in the connector shaft housing using an end cap; and
   a roller assembly comprising a roller frame that is rigidly mechanically coupled to the hinge shaft, wherein the biasing spring is selected to provide a compressive bias to the stop block such that the roller assembly selectively rotates about the hinge axis housing when the roller assembly is subjected to a landmine detonation, and such that rotation of the hinge shaft is prevented during normal forward, reverse, and turning maneuvers.

2. The system of claim 1 wherein the hitch assembly further comprises a connector shaft that is slidable inside of the connector shaft housing, the connector shaft housing further houses a transverse portion of the hinge shaft at the intersection of the connector shaft housing with the hinge axis housing, and the connector shaft has a first end that includes a tang that is configured to engage at least one matching slot in the hinge shaft and thereby prevent rotation of the hinge shaft during normal forward reverse, and turning maneuvers.

3. The system of claim 2 wherein the hitch assembly further comprises:
   left and right connector assembly arms;
   left and right turning control arms;
   a latch housing;
   left and right lateral beams;
   left and right pivot assemblies;
   left and right control eyelets; and
   a tow connector eyelet, and
   the connector assembly arms, the hinge axis housing, the connector shaft housing, the latch housing, the lateral beams, and the pivot assemblies are combined to form a substantially rigid framework;
   the left and right control eyelets are mechanically coupled to first ends of respective left and right turning control arms;
   the tow connector eyelet is mechanically coupled to a second end of the connector shaft; and
   the left and right control eyelets and the tow connector eyelet are mechanically coupled to a tow vehicle.

4. The system of claim 3 wherein the roller assembly includes a roller sub-assembly having a plurality of massive cog-wheel rollers that rotate on a roller shaft and that has sufficient weight to trigger the detonation of landmines to clear an area when drawn by the vehicle.

5. The system of claim 4 wherein respective left and right intersections of the connector assembly arms, the latch housing, and the lateral beams comprise substantially vertical, substantially cylindrical left and right turning arm pivot housings that house respective left and right pivots pivotably mounted in the turning arm pivot housings, the pivots comprises an end cap that holds the pivot in the turning arm pivot housing, a control arm housing that is shaped to slidably receive the respective control arm, and a substantially cylindrical pivot stub that is sized to receive the end cap at an end that extends vertically through the turning arm pivot housing, and side-to-side pivot of the respective control arm is achieved via rotation of the pivot stub section of the pivot in the turning arm pivot housing.

6. The system of claim 5 wherein respective left and right latch apparatuses are included internal to the latch housing and each latch apparatus comprises a locking device, an interconnect cable, and a pull link, and the cable flexibly mechanically couples the respective locking device and pull link at opposing ends.

7. The system of claim 6 wherein the pull link has a first end that is rotatably coupled to the interconnect cable and a second end that is rotatably coupled to the connector shaft via a link pin, and when the system is towed in a forward moving maneuver, the connector shaft is urged slidably forward, the links encounter the inner surface of the intersection of the connector shaft and latch housings and rotate about the link pin such that tension is applied to the cables and the sliding movement of the connector shaft is limited.

8. The system of claim 7 wherein each control arm further comprises respective latch holes disposed longitudinally along the control arm towards a second end that engages respective ones of the pivot assemblies, and each locking device comprises a latch key, a latch rotation pin, a latch spring implemented as a coil spring, and a stabilizer pin, and the latch key engages a latch hole to lock in-out sliding of the respective control arm during a backing up maneuver.

9. The system of claim 8 wherein the latch key comprises a first leg that engages a latch hole and a second leg that is mechanically coupled to the respective interconnect cable at a first end and rotatably mechanically coupled to the latch housing via the respective latch rotation pin, the latch spring is positioned under compression to provide a biasing force between an inner surface of the latch housing and the first leg of the latch key, the biasing force between the inner surface of the latch housing and the first leg of the latch key biases the latch key towards engagement in one of the latch holes, the stabilizer pin is disposed internal to the latch spring and is sized having a length such that both ends of the stabilizer pin extend outside of the latch spring and the ends of the stabilizer pin engage respective notches in the latch housing and the latch key, and when the connector shaft is urged in a forward direction, the biasing force between the inner surface of the latch housing and the first leg of the latch key is overcome by the tension generated on the interconnect cable which causes the locking device to unlock and the control arm to be free to move slidably in the respective pivot housing.

10. A method of providing tow vehicle backup with anti-jack knife and anti-dive for clearing landmines, the method comprising:

rigidly mechanically coupling a hinge axis housing containing a hinge shaft and a connector shaft housing containing a stop block having a first side that engages a flat region on the hinge shaft and a second side that engages a biasing spring that is held in the connector shaft housing using an end cap to form a hitch assembly; and rigidly mechanically coupling a roller assembly comprising a roller frame to the hinge shaft, wherein the biasing spring is selected to provide a compressive bias to the stop block such that the roller assembly selective rotates about the hinge axis housing when the roller assembly is subjected to a landmine detonation, and such that rotation of the hinge shaft is prevented during normal forward, reverse, and turning maneuvers.

11. The method of claim 10 wherein the hitch assembly further comprises a connector shaft that is slidable inside of the connector shaft housing, the connector shaft housing further houses a transverse portion of the hinge shaft at the intersection of the connector shaft housing with the hinge axis housing, and the connector shaft has a first end that includes a tang that is configured to engage at least one matching slot in the hinge shaft and thereby prevent rotation of the hinge shaft during normal forward reverse, and turning maneuvers.

12. The method of claim 11 wherein the hitch assembly further comprises:

left and right connector assembly arms;

left and right turning control arms;

a latch housing;

left and right lateral beams;

left and right pivot assemblies;

left and right control eyelets; and a tow connector eyelet, and the connector assembly arms, the hinge axis housing, the connector shaft housing, the latch housing, the lateral beams, and the pivot assemblies are combined to form a substantially rigid framework;

the left and right control eyelets are mechanically coupled to first ends of respective left and right turning control arms;

the tow connector eyelet is mechanically coupled to a second end of the connector shaft; and the left and right control eyelets and the tow connector eyelet are mechanically coupled to a tow vehicle.

13. The method of claim 12 wherein the roller assembly includes a roller sub-assembly having a plurality of massive cog-wheel rollers that rotate on a roller shaft and that has sufficient weight to trigger the detonation of landmines to clear an area when drawn by the vehicle.

14. The method of claim 13 wherein respective left and right intersections of the connector assembly arms, the latch housing, and the lateral beams comprise substantially vertical, substantially cylindrical left and right turning arm pivot housings that house respective left and right pivots pivotably mounted in the turning arm pivot housings, the pivots comprises an end cap that holds the pivot in the turning arm pivot housing, a control arm housing that is shaped to slidably receive the respective control arm, and a substantially cylindrical pivot stub that is sized to receive the end cap at an end that extends vertically through the turning arm pivot housing, and side-to-side pivot of the respective control arm is achieved via rotation of the pivot stub section of the pivot in the turning arm pivot housing.

15. The method of claim 14 wherein respective left and right latch apparatuses are included internal to the latch housing and each latch apparatus comprises a locking device, an interconnect cable, and a pull link, and the cable flexibly mechanically couples the respective locking device and pull link at opposing ends.

16. The method of claim 15 wherein the pull link has a first end that is rotatably coupled to the interconnect cable and a second end that is rotatably coupled to the connector shaft via a link pin, and when the system is towed in a forward moving maneuver, the connector shaft is urged slidably forward, the links encounter the inner surface of the intersection of the connector shaft and latch housings and rotate about the link pin such that tension is applied to the cables and the sliding movement of the connector shaft is limited.

17. The method of claim 16 wherein each control arm further comprises respective latch holes disposed longitudinally along the control arm towards a second end that engages respective ones of the pivot assemblies, and each locking device comprises a latch key, a latch rotation pin, a latch spring implemented as a coil spring, and a stabilizer pin, and the latch key engages a latch hole to lock in-out sliding of the respective control arm during a backing up maneuver.

18. The method of claim 17 wherein the latch key comprises a first leg that engages a latch hole and a second leg that is mechanically coupled to the respective interconnect cable at a first end and rotatably mechanically coupled to the latch housing via the respective latch rotation pin, the latch spring is positioned under compression to provide a biasing force between an inner surface of the latch housing and the first leg of the latch key, the biasing force between the inner surface of the latch housing and the first leg of the latch key biases the latch key towards engagement in one of the latch holes, the stabilizer pin is disposed internal to the latch spring and is sized having a length such that both ends of the stabilizer pin extend outside of the latch spring and the ends of the stabilizer pin engage respective notches in the latch housing and the latch key, and when the connector shaft is urged in a forward direction, the biasing force between the inner surface of the latch housing and the first leg of the latch key is overcome by the tension generated on the interconnect cable which causes the locking device to unlock and the control arm to be free to move slidably in the respective pivot housing.

* * * * *